United States Patent
Chen

(10) Patent No.: US 10,533,681 B2
(45) Date of Patent: Jan. 14, 2020

(54) CERAMIC VALVE WITH A FUNCTION OF INFORMING OPERATION POSITION

(71) Applicant: KUCHING INTERNATIONAL LTD., Tanzih Township, Taichung County (TW)

(72) Inventor: Mei-Li Chen, Tanzih Township, Taichung County (TW)

(73) Assignee: KUCHING INTERNATIONAL LTD., Tanzih Township (TW)

( * ) Notice: Subject to any disclaimer, the term of this patent is extended or adjusted under 35 U.S.C. 154(b) by 39 days.

(21) Appl. No.: 15/836,165

(22) Filed: Dec. 8, 2017

(65) Prior Publication Data

US 2019/0178413 A1 Jun. 13, 2019

(51) Int. Cl.
| | | |
|---|---|---|
| *F16K 35/04* | (2006.01) | |
| *F16K 11/00* | (2006.01) | |
| *F16K 11/078* | (2006.01) | |
| *F16K 3/08* | (2006.01) | |
| *F16K 27/04* | (2006.01) | |

(52) U.S. Cl.
CPC ............... *F16K 35/04* (2013.01); *F16K 3/08* (2013.01); *F16K 11/0782* (2013.01); *F16K 19/006* (2013.01); *F16K 27/045* (2013.01); *E03C 2201/30* (2013.01)

(58) Field of Classification Search
CPC .......... F16K 35/04; F16K 27/045; F16K 3/08; F16K 19/006; F16K 11/0782; E03C 2201/30; Y10T 137/9464; Y10T 137/86815; Y10T 137/86847
USPC .................................. 137/801, 625.4, 625.44
See application file for complete search history.

(56) References Cited

U.S. PATENT DOCUMENTS

| | | | |
|---|---|---|---|
| 4,573,493 A * | 3/1986 | Hammarstedt | F16K 11/207 137/246 |
| 9,249,563 B2 * | 2/2016 | Yasuhara | E03C 1/0404 |
| 2010/0193039 A1 * | 8/2010 | Illingworth | E03C 1/04 137/112 |

* cited by examiner

*Primary Examiner* — Michael R Reid

(57) ABSTRACT

A ceramic valve with a function of informing the operation position includes casing, a drive device partially and rotatably secured in the casing, a clicker longitudinally mounted to an upper portion of the casing and an outlet control device mounted to a lower portion of the casing for holding the drive device in place, wherein the drive seat extending through the clicker. The clicker informs an operation position by a "click" sound when the outlet control device is driven to a cold water supplying position, a hot water supplying position and a mixing water supplying position.

10 Claims, 11 Drawing Sheets

CERAMIC VALVE WITH A FUNCTION OF INFORMING OPERATION POSITION

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a ceramic valve, and more particularly to a ceramic valve with a function of informing the operation position.

2. Description of Related Art Including Information Disclosed Under 37 CFR 1.97 and 37 CFR 1.98

Recently, the operational safety of a cold/hot water faucet (hereinafter referred to as a dual-temperature faucet), especially its anti-scalding function, is of great concern in the industry. For this reason, multiple dual-temperature faucets with anti-scalding function have been developed. For example, a retaining structure is set on the switching path, so the user has to apply a greater force when switching to hot water mode.

In view of the currently available dual-temperature faucet, if the user pulls up the handle already set on the middle section, the preset water supply is in a mixing state, rather than in a cold water state. However, some shortcomings are still observed from the structural design of such a dual-temperature faucet. If cold water supply state is required when the handle of the dual-temperature faucet is pulled up, the user may firstly turn the handle to the ready position for cold water and then pull up the handle properly. Yet, due attention shall be paid to more scalding possibilities in anti-scalding design. Assuming that the handle is pulled up unintentionally or unwittingly by the user (e.g. children or the elderly) from the middle section, a mixing water state would be expected, but in fact there exist some unstable factors, for example, when water supply pressure at the cold water end is weak, this permits direct switching to hot water mode, leading to scalding hazards. Besides, the swinging angles of warm/hot water modes for the dual-temperature faucet differ very little, this will turn to hot water mode once the user slightly shifts or impinges on it. On the other hand, when the user pulls up the handle from the middle section, since the cold/hot water inlets are partially open, insufficient water pressure makes it impossible to ignite gas for hot water, leading possible to gas leakage.

Furthermore, when the handle of conventional dual-temperature faucet is reset, the user could also reset it to the ready position for cold water, and then pulls up directly for a cold water supply state. To realize the balance of aesthetic effects, most of the user often reset the handle to the middle position after closing the faucet, especially in hotels and guesthouse where quality of service and customer satisfaction are of top priority. Hence, a feasible solution against the aforementioned problems is how to improve the design of the inner ceramic valve structure of a dual-temperature faucet.

Thus, to overcome the aforementioned problems of the prior art, it would be an advancement if the art to provide an improved structure that can significantly improved efficacy.

Therefore, the inventor has provided the present invention of practicability after deliberate design and evaluation based on years of experience in the production, development and design of related products.

BRIEF SUMMARY OF THE INVENTION

The main objective of the present invention is to provide an improved ceramic valve with a function of informing operation position.

To achieve the objective, the ceramic valve in accordance with the present invention comprises a cylinder-like casing having a protrusion centrally and longitudinally extending from a top thereof, a top opening defined in the protrusion and a bottom opening defined in a lower portion of the casing, and multiple longitudinal slots defined in the outer periphery of the protrusion. A drive seat is partially and rotatably received in the casing. The drive seat includes a trigger pivotally mounted thereto, wherein the trigger extends through the top opening. The drive seat is formed with an engaging portion, wherein a top of the engaging portion has a horizontal height higher than that of the protrusion relative to the casing. A clicker is sleeved on and engaged to the engaging portion such that the clicker is rotated with the drive seat when adjusting a temperature of the outlet water. An outlet control device received in the casing, wherein a coupling block is disposed between the outlet control device and the drive seat such that the drive seat operating the outlet control device to adjusting the temperature of the outlet water. The clicker informs an operation position by a "click" sound when the outlet control device is driven to a cold water supplying position, a hot water supplying position and a mixing water supplying position.

Further benefits and advantages of the present invention will become apparent after a careful reading of the detailed description with appropriate reference to the accompanying drawings.

DETAILED DESCRIPTION OF THE INVENTION

Figure 1:
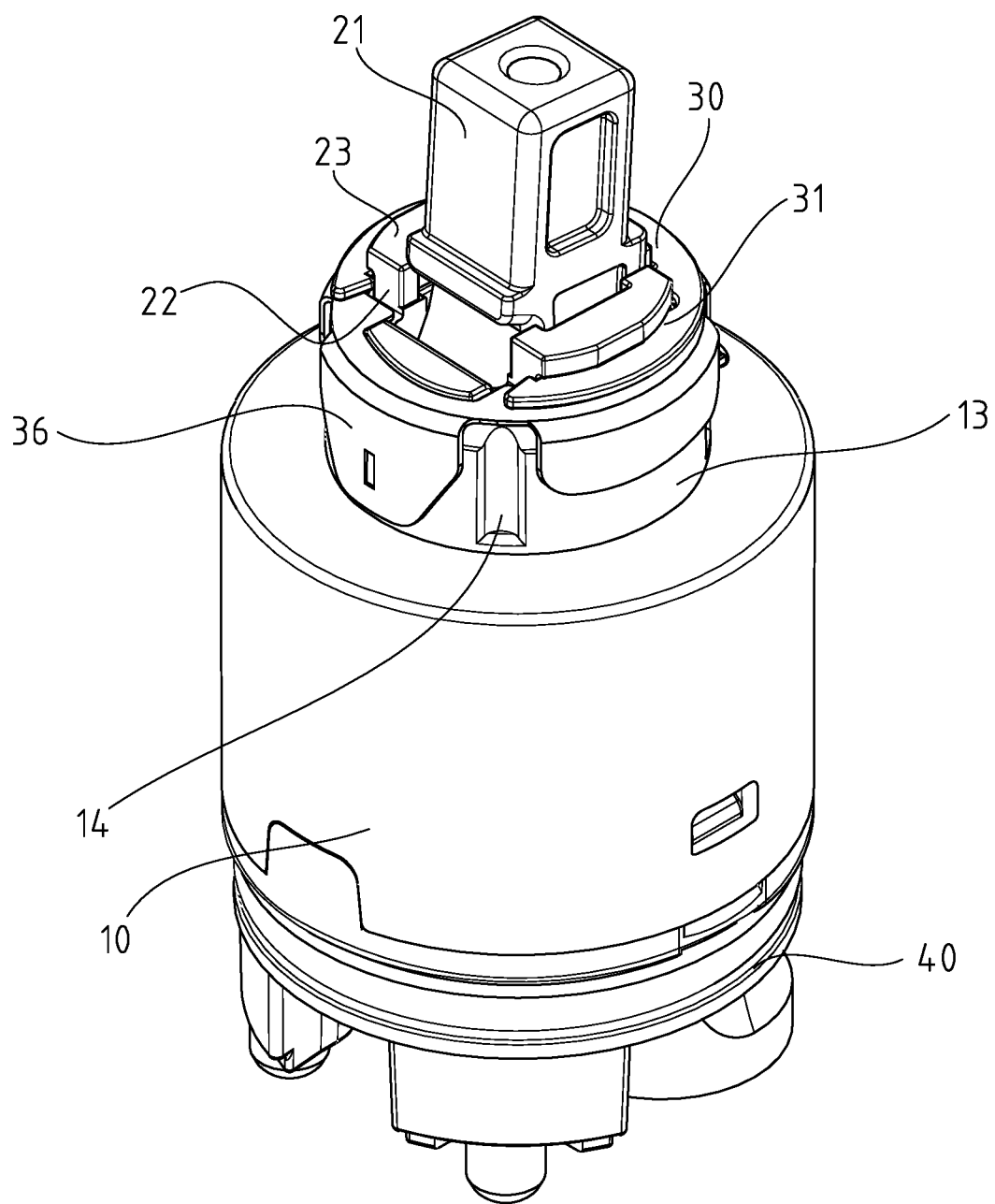
FIG. 1 is a perspective view of a ceramic valve with a function of informing operation position in accordance with the present invention.
Figure 1A:
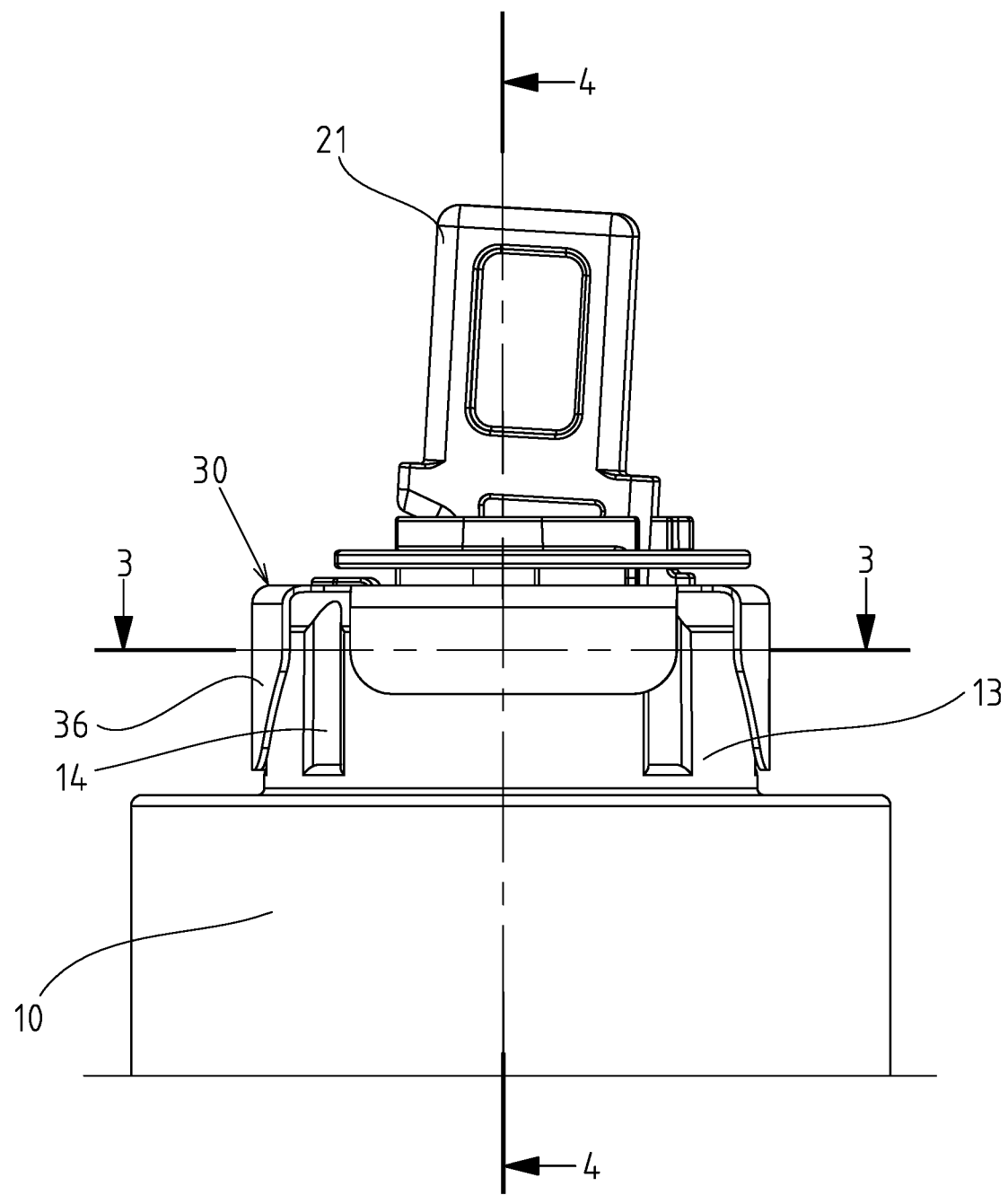
FIG. 1A is a side plan view of the ceramic valve with a function of informing operation position in accordance with the present invention.
Figure 2:
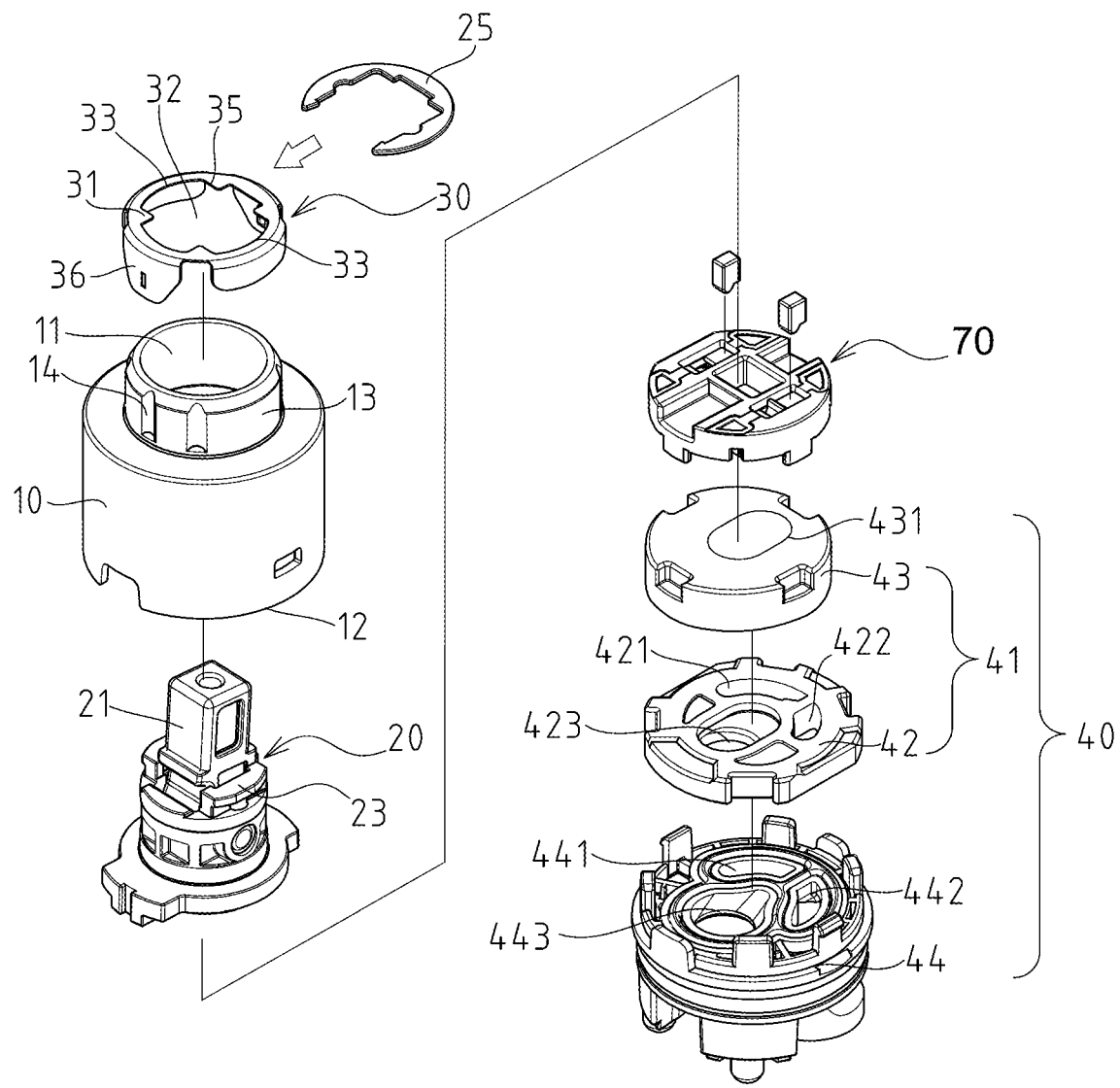
FIG. 2 is an exploded perspective view of the ceramic valve in FIG. 1.
Figure 3:
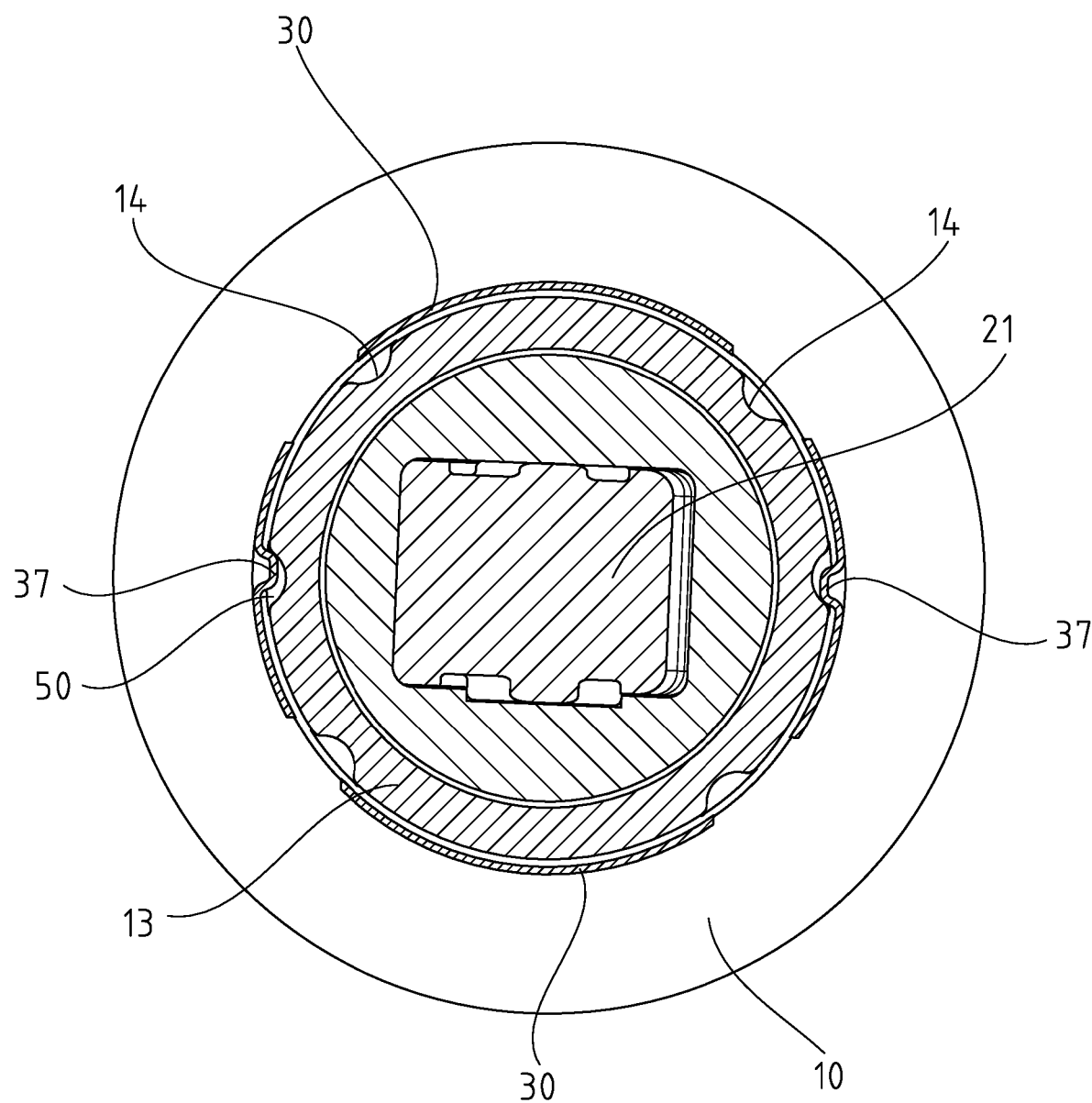
FIG. 3 is a cross-sectional view of a ceramic valve along line 3-3 in FIG. 1A.

Referring to the drawings and initially to FIGS. 1 and 2, a ceramic valve with a function of informing operation position in accordance with the present invention comprises casing 10, a drive device 20 partially and rotatably secured in the casing 10, a clicker 30 longitudinally mounted to an upper portion of the casing 10 and an outlet control device 40 mounted to a lower portion of the casing 10 for holding the drive device 20 in place, wherein the drive seat 20 extending through the clicker 30.

In the preferred embodiment of the present invention, the casing 10 is a cylinder-like structure, and a protrusion 13 centrally and longitudinally extending from a top thereof. A top opening 11 is defined in the protrusion 13 and a bottom opening 12 is defined in a lower portion of the casing 10. Multiple longitudinal slots 14 are defined in the outer periphery of the protrusion 13.

The drive seat 20 is rotatably received in the protrusion 13 and includes a trigger 21 pivotally mounted thereto, wherein the trigger 21 extends through the top opening 11. The drive seat 20 is formed with an engaging portion 22, wherein a top of the engaging portion 22 has a horizontal height higher than that of the protrusion 13 relative to the casing 10.

The clicker 30 is formed from metal sheet, wherein the material of the metal sheet is selected from a group consisted of stainless steel, iron, aluminum and alloy. Through a durability test, the durability of the clicker 30 is over five hundred thousand times. The clicker 30 is rotatably sleeved on the protrusion 13 and rotated with the drive seat 20. The clicker 30 is formed with a driven portion 31 and has a through hole 32 defined in the driven portion 31, wherein the engaging portion 22 extends through the through hole 32 and engaged to the clicker 30 such that the clicker 30 is rotated with the drive seat 20 when adjusting the temperature of the outlet water. The clicker 30 includes multiple tongues 36 extending therefrom and peripherally corresponding to the protrusion 13. Each tongue 36 has a raised structure 37 formed thereon and each raised structure 37 is selectively received in a corresponding one of the multiple longitudinal slots 14. The raised structure 37 and the corresponding longitudinal slot 14 provide a function of informing operation position when the trigger 21 drives the outlet control device 40 to a cold water supplying position, a hot water supplying position and a mixing water supplying position. With reference to FIG. 6B, the raised structure 37 extends into the corresponding longitudinal slot 14 in a pre-set depth D1 such that a first clearance 60 is defined between a top of the raised structure 37 and a bottom of the corresponding longitudinal slot 14, and a second clearance 61 is defined between the protrusion 13 and the multiple tongues 36. The first clearance 60 and the second clearance 61 provide a clicking space to the clicker 30.

The outlet control device 40 is received in the casing 10, wherein a coupling block 70 is disposed between the outlet control device 40 and the derive 20, and the drive device 20 drives the outlet control device 40 to a cold water supplying position, a hot water supplying position and a mixing water supplying position via the coupling block 70. The outlet control device 40 includes a pedestal 44 and a block set 41 disposed on the pedestal 44. The pedestal 44 is disposed within the bottom opening of the casing 10. The pedestal 44 includes a cold water inlet 441, a hot water inlet 442 and an outlet 443 defined therein. The block set 41 includes a fixed block 42 water-tightly and securely abutting the pedestal 44, and a rotary block 43 water-tightly and rotatably abutting the fixed block 42. The fixed block 42 includes a first through hole 421, a second through hole 422 and a third through hole 423 respectively defined therein, wherein the first through hole 421, the second through hole 422 and the third through hole 423 respectively correspond to the cold water inlet 441, the hot water inlet 442 and the outlet 443. The rotary block 43 water-tightly and securely abuts a bottom of the coupling block 70 and has a tunnel 431 defined therein, wherein the tunnel 431 has a first end communicating with the third through hole 423 and a second end communicating with at least one of the first through hole 421 and the second through hole 422.

Figure 6:
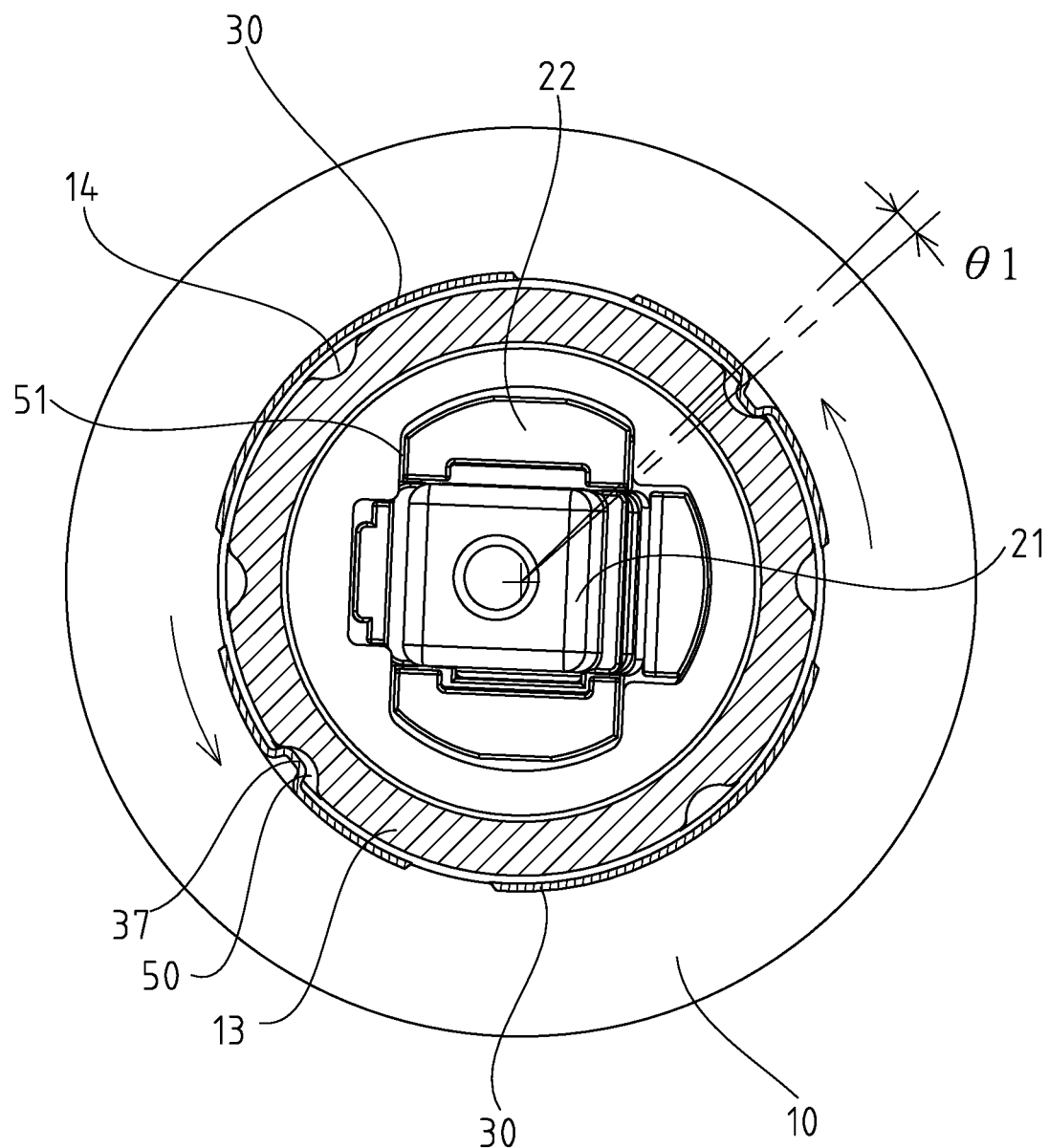
FIG. 6 is an operational view of the ceramic valve in accordance with the present invention.
Figure 6A:
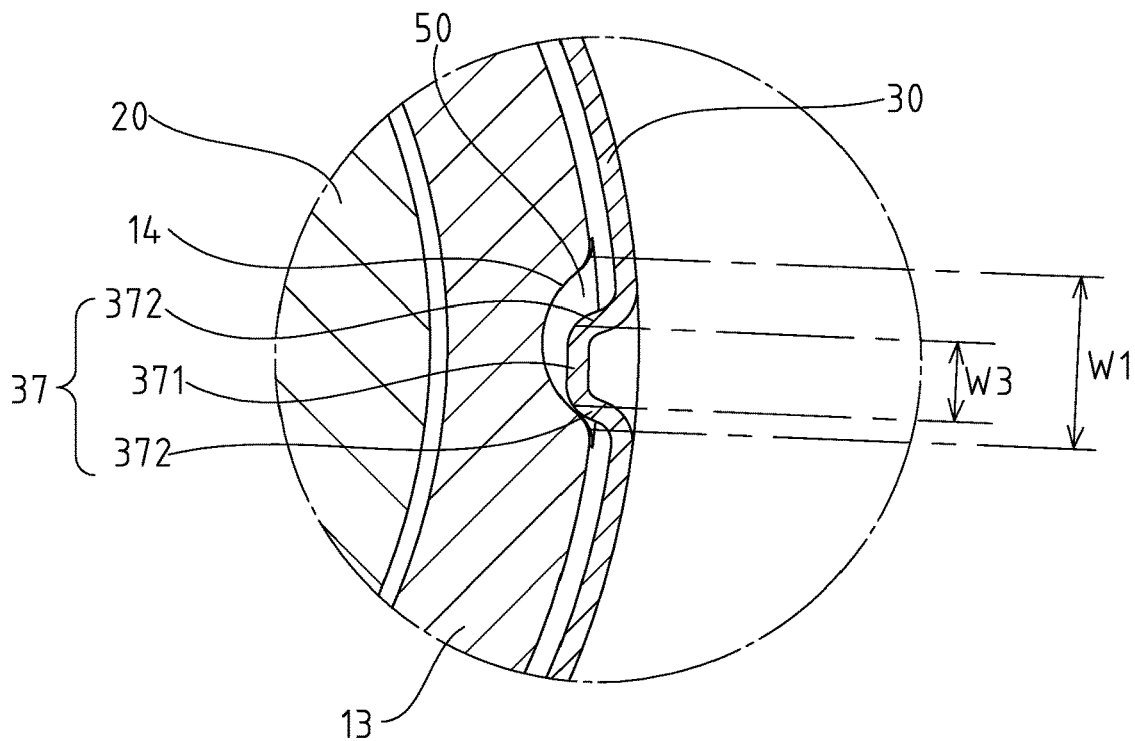
FIG. 6A is a partially enlarged view of FIG. 6.
Figure 6B:
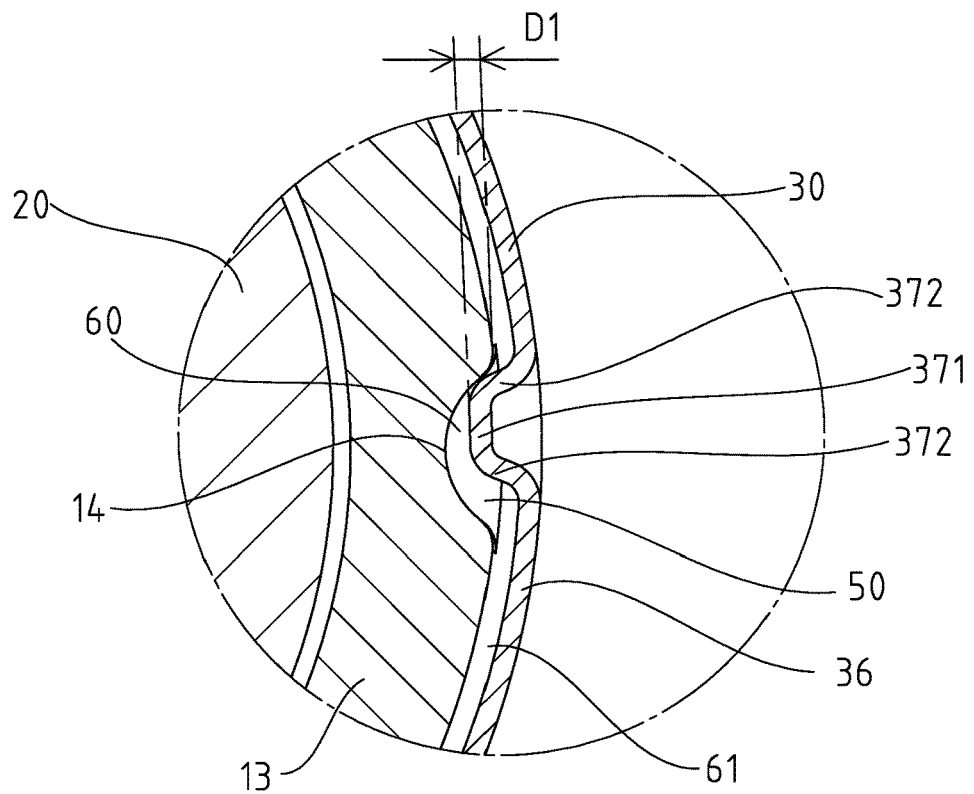
FIG. 6B is a partially enlarged view of FIG. 6A.

With reference to FIGS. 6 and 6A, a first avoidance space 50 is defined between a periphery of the corresponding longitudinal slot 14 and the raised structure 37, and the clicker 30 has a first rotation angle θ1 due to the first avoidance space 50 when the raised structure 37 is received in the corresponding one of the multiple longitudinal slots 14. The raised structure 37 is formed with a plan portion 371 having a width W3 smaller than a width W1 of an opening of the corresponding longitudinal slot 14.

Figure 5:
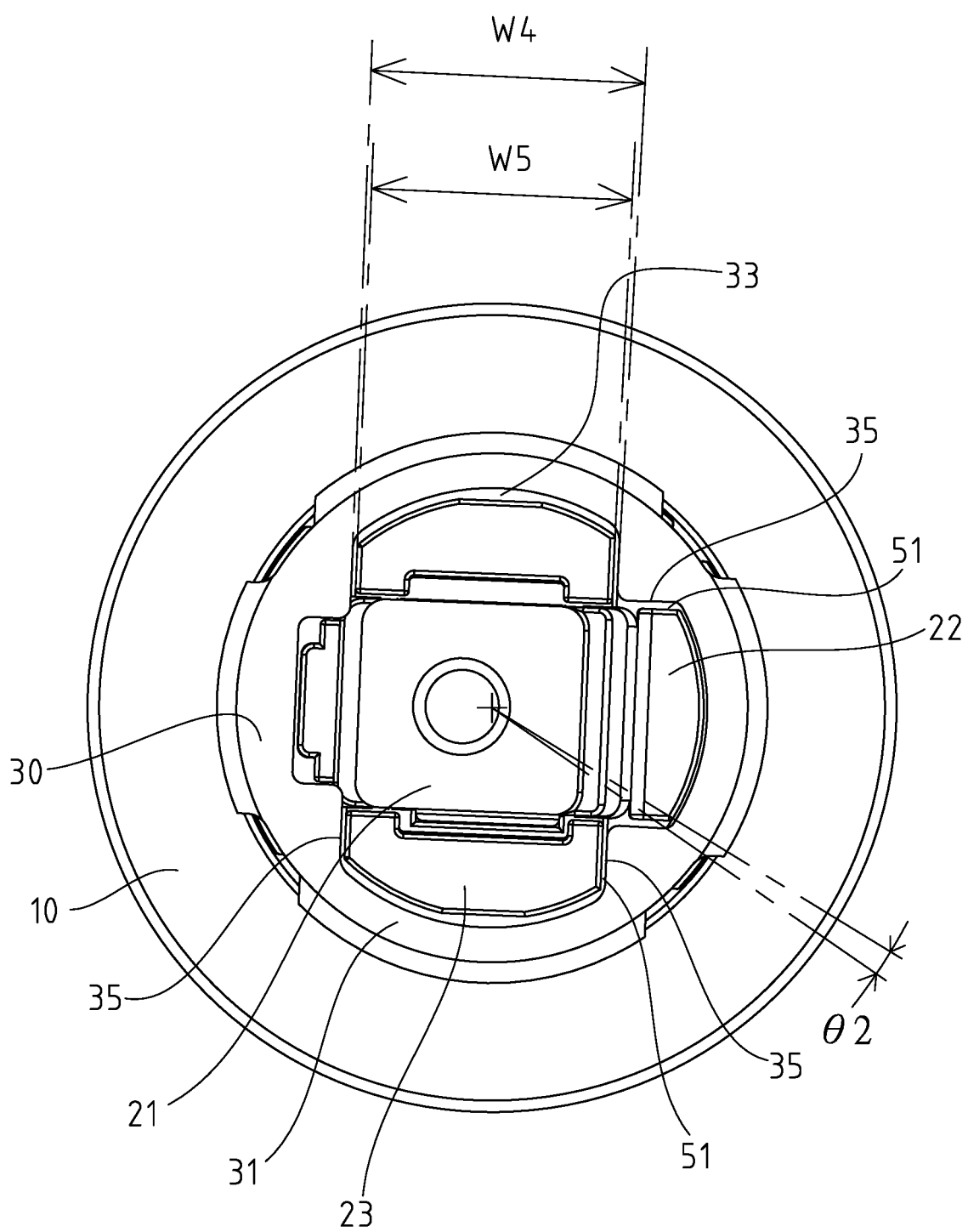
FIG. 5 is a top plan view of the ceramic valve in FIG. 1.

With reference to FIGS. 2 and 5, the clicker 30 includes two concave portions 33 defined in an inner periphery of the through hole 32, wherein each concave portion 33 has a width W4 greater than a width W5 of the engaging portion 22. A second avoidance space 51 is defined between the concave portion 32 and the engaging portion 22 such that the clicker 30 has a second rotation angle θ2 due to the second avoidance space 51 when the slicker 30 is sleeved on the engaging portion 22.

Figure 4:
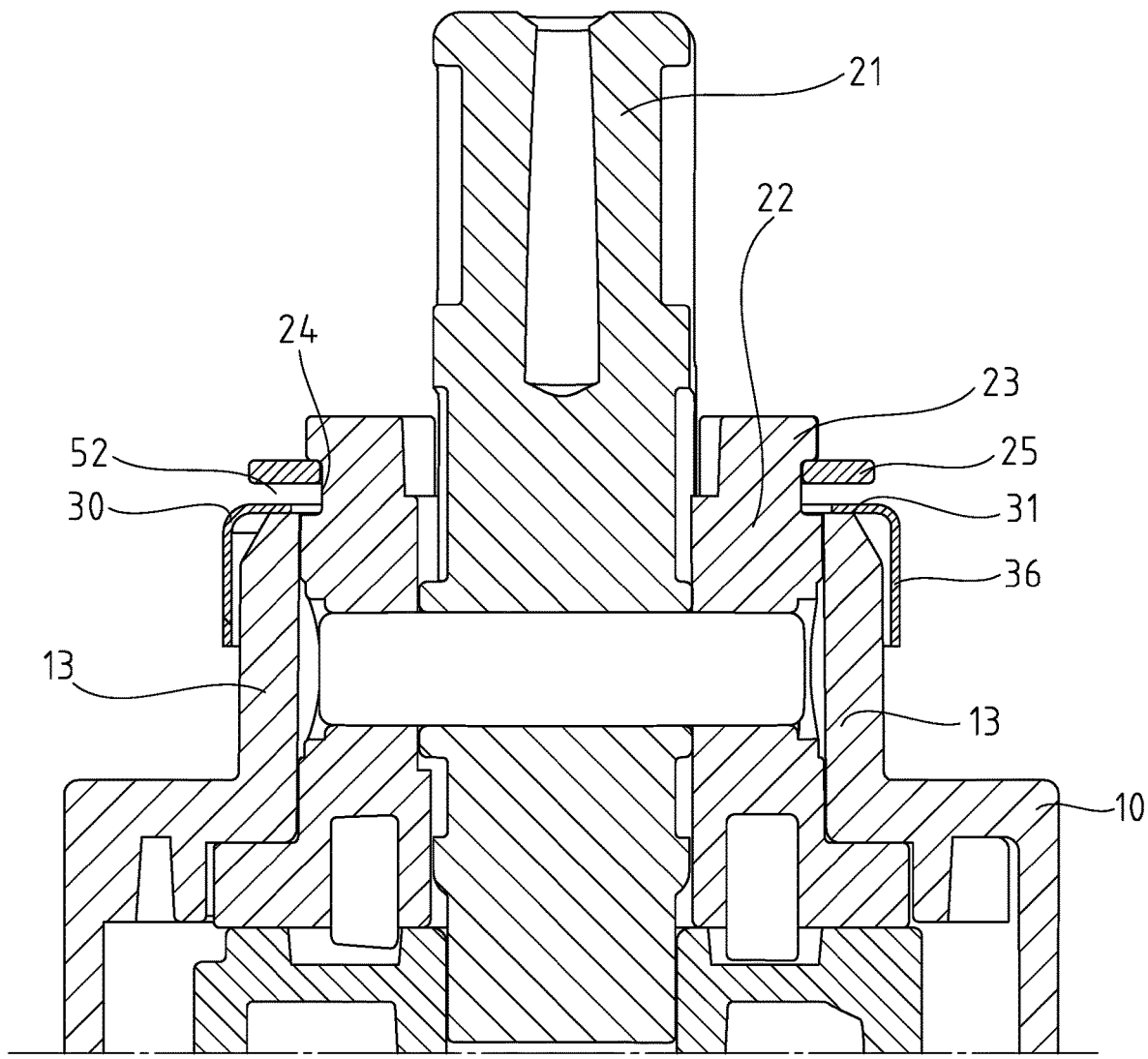
FIG. 4 is a cross-sectional view of a ceramic valve along line 4-4 in FIG. 1A.
Figure 4A:
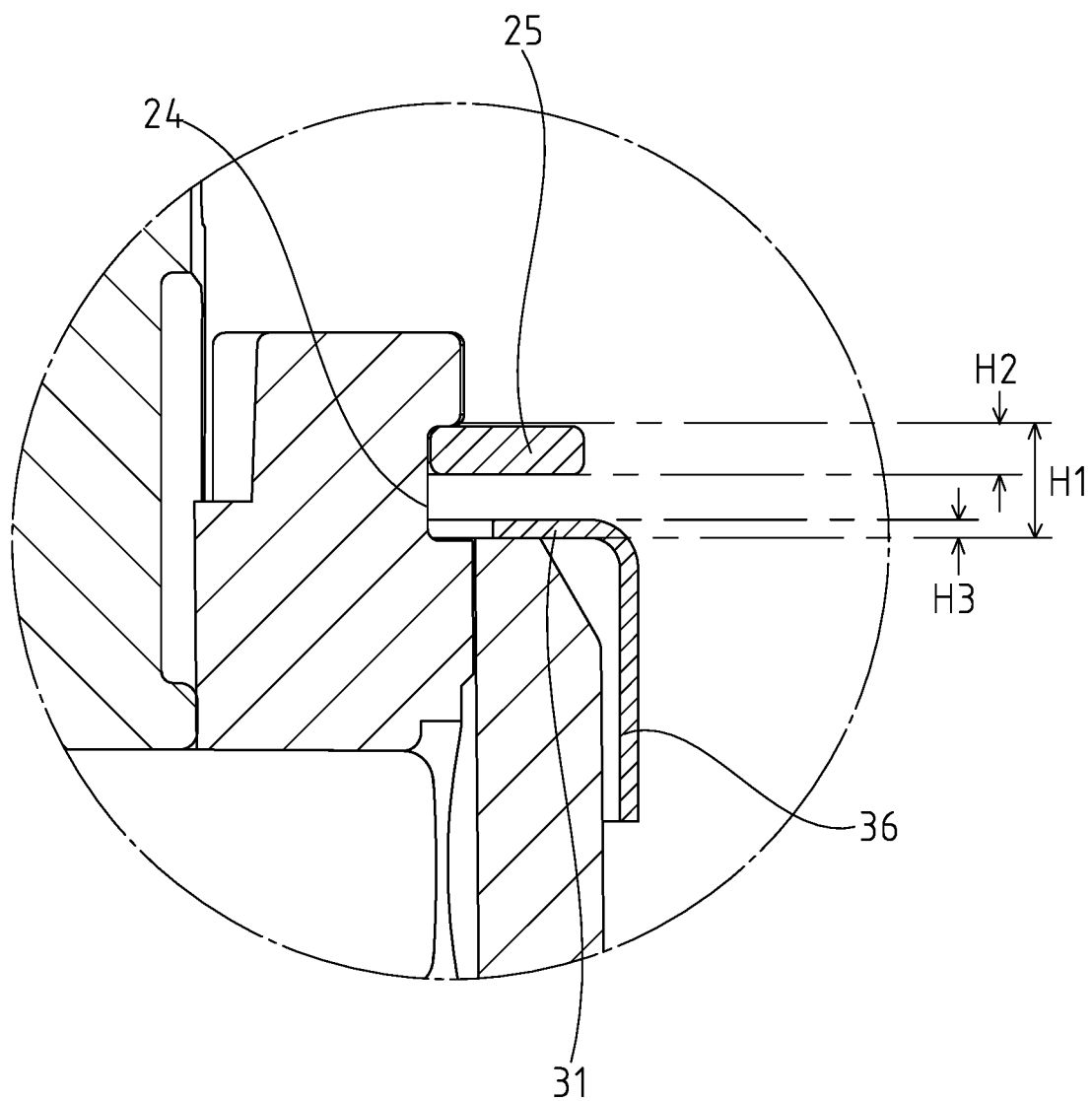
FIG. 4A is a partially enlarged view of FIG. 4.

With reference to FIGS. 2, 4 and 4A, the drive seat 20 has two stoppers 23 laterally extending from a top of the engaging portion 22 and two grooves 24 laterally defined in the engaging portion 22 below the two stoppers 23. A locking member 25 is engaged to the engaging portion 22 between the stopper 23 and the clicker 30. Each groove 24 has a width H1 greater than a total of a thickness H2 of the locking member 25 and a thickness H3 of the clicker 30 such that a first vibration space 52 is defined between the locking member 25 and the clicker 52.

As described above, with reference to FIGS. 2, 5 and 6, each concave portion 33 has two opposite sides respectively formed with a straight edge 35. The trigger 21 and the drive seat 20 are rotated when the faucet (not shown) is operated to a cold water supplying position from a middle position by a lever (not shown) of the faucet. The drive seat 20 has a rotation angle θ2 when one end of the engaging portion 22 is laterally engaged to a corresponding one of the straight edges 35, and then the drive seat 20 drives the clicker 30 and the clicker 30 is rotated with the drive seat 20. Further with reference to FIG. 6A, the raised structure 37 abuts one side of the corresponding longitudinal slot 14. The clicker 30 is rotated when the level is continually operated to make the drive seat 20 driving the clicker 30. The raised structure 37 is moved within the corresponding longitudinal slot 14 due to the first avoidance space 50 because plan portion 371 having a width W3 smaller than a width W1 of an opening of the corresponding longitudinal slot 14. Then, with reference to FIG. 6B, the rotation angle of the raised structure 37 is equal to the first rotation angle θ1 when the raised structure 37 is moved from one side of corresponding longitudinal slot 14 to the other. The raised structure 37 is escaped from the corresponding longitudinal slot 14 due to a material behavior of the clicker 30 and the raised structure 30 is moved along a periphery of the protrusion 13 to a lateral longitudinal slot 14 when the lever is continually turned. Finally, the clicker 30 is clicked and informs an operation position (cold water supplying position) by "click" sound due to a vibration margin defined by the first avoidance space 50, the second avoidance space 51 and the first vibration space 52. Consequently, the operation of the facet is promoted and the operator can clearly identify the water supplying condition to prevent the ceramic valve from an erroneous operation.

On the contrary, the lever of the faucet is oppositely operated the drive the trigger 21 and the drive seat 20 for turning the ceramic valve to the hot water supplying position or the mixing water supplying position from the cold water supplying position. Accordingly, the clicker 30 also provides a "click" sound to provide the function of informing operation position.

Figure 7:
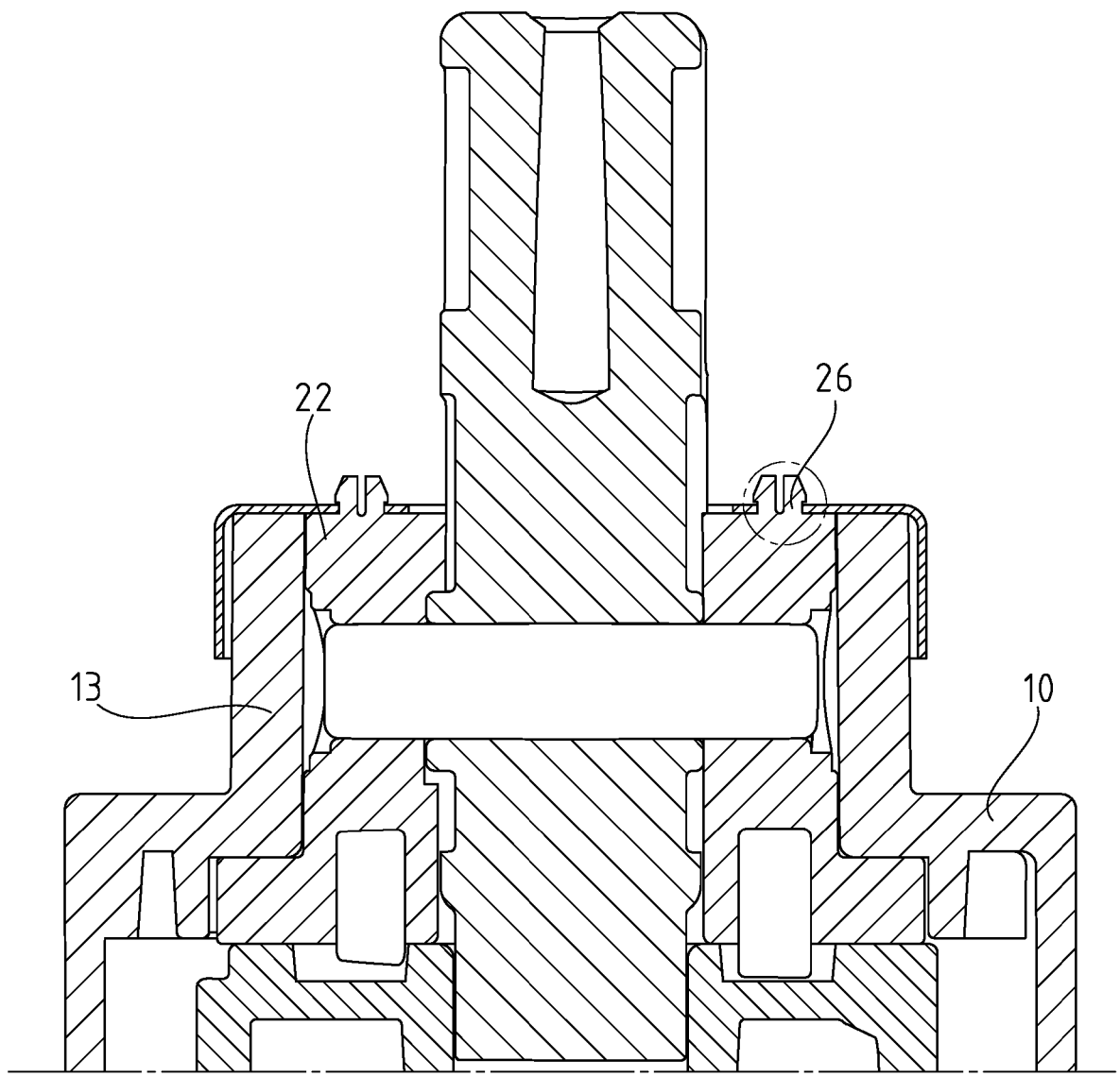
FIG. 7 is a partially cross-sectional view of a second embodiment of the ceramic valve with a function of informing operation position in accordance with the present invention.
Figure 7A:
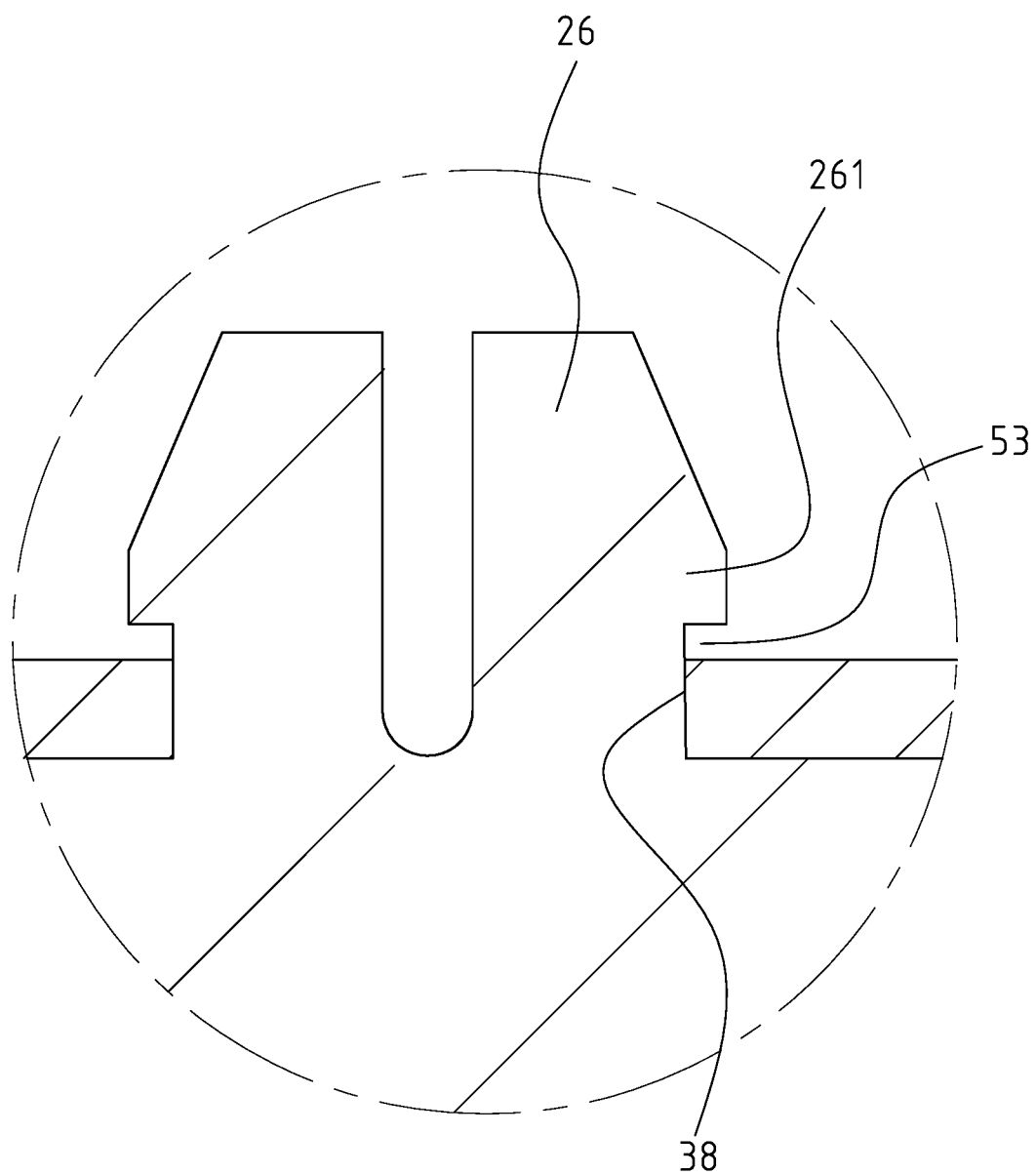
FIG. 7A is a partially enlarged view of FIG. 7.

With reference to FIGS. 7 and 7A that show a second embodiment of the ceramic valve in accordance with the present invention, in this embodiment, the clicker 30 has at least through hole 38 defined in the driven portion 31 thereof and the engaging portion 22 has at least one stub 26 longitudinally extending from a top of the engaging portion 22, wherein the at least one stub 26 extends through the at least one through hole 38 in the driven portion of the clicker 30 such that the clicker 30 is simultaneously rotated with the drive seat 20 when adjusting the temperature of the outlet water. Furthermore, the at least one stub 26 has an enlarged portion 261 formed on a free end thereof for preventing the clicker 30 from detaching from the drive seat 20. In addition, the at least one enlarged portion 261 has a horizontal height higher than that of the clicker 30 relative to the top of the engaging portion 22 such that a second vibration space 53 is defined between the at least one enlarged portion 261 and the top of the engaging portion 22.

As described above, the clicker 30 also provides a "click" sound to provide the function of informing operation position when the raised portion 37 engaged into a corresponding one of the longitudinal slots 14 that respectively correspond to the cold water supplying position, the hot water supplying position and the mixing water supplying position to prevent the ceramic valve from an accidental operation.

Although the invention has been explained in relation to its preferred embodiment, it is to be understood that many other possible modifications and variations can be made without departing from the spirit and scope of the invention as hereinafter claimed.

I claim:

1. A ceramic valve apparatus comprising:
   a cylindrical casing;
   an outlet control device received in said cylindrical casing, said cylindrical casing having a outlet that passes outlet water;
   said cylindrical casing having a central protrusion extending longitudinally from a top of said cylindrical casing, said cylindrical casing having a top opening defined in said central protrusion and a bottom opening defined in a lower portion of said cylindrical casing, the central protrusion having multiple longitudinal slots defined in an outer periphery of the central protrusion;
   a drive seat partially and rotatably received in said cylindrical casing, said drive seat having a trigger pivotally mounted thereto, the trigger extending through the top opening, said drive seat having an engaging portion, wherein a top of the engaging portion has a height greater than a height of the central protrusion relative to said cylindrical casing;
   a clicker sleeved onto and engaged with the engaging portion such that said clicker rotates with the drive seat when a temperature of the outlet water from the outlet is adjusted, said clicker having a driven portion with a through hole defined in the driven portion, the engaging portion extending through the through hole and engaged with said clicker such that said clicker rotates with said drive seat when the temperature of the outlet water is adjusted, said clicker having multiple tongues extending therefrom and peripherally corresponding to the central protrusion, wherein each tongue of the multiple tongues has a raised structure formed thereon respectively received in a longitudinal slot of the multiple longitudinal slots of the central protrusion, the raised structure and the corresponding longitudinal slot providing information pertaining to an operational position when the trigger drives the outlet control device between a cold water supplying position and a hot water supplying position, wherein a first avoidance space is defined between a periphery of the corresponding longitudinal slot and the raised structure, said clicker having a first rotation angle at the first avoidance space when the raised structure is received in a corresponding longitudinal slot of the multiple longitudinal slots, said clicker having a pair of concave portions defined in an inner periphery of the through hole, wherein each of the pair of concave portions has a width greater than a width of the engaging portion, wherein a second avoidance space is defined between the concave portion and the engaging portion such that said clicker has a second rotation angle when said clicker is sleeved onto the engaging portion; and
   a coupling block disposed between said outlet control device and said drive seat such that said drive seat operates said outlet control device in order to adjust the temperature of the outlet water, said clicker providing the information pertaining to the operational position by a click sound when said outlet control device is moved between the cold water supplying position and the hot water supplying position and a mixed water supplying position.

2. The ceramic valve apparatus of claim 1, wherein said drive seat has a pair of stoppers laterally extending from a top of the engaging portion, said driver seat having a pair of grooves laterally defined in the engaging portion between the pair of stoppers, said drive seat having a locking member engaging the engaging portion between one of the pair of stoppers and said clicker, each of the pair of grooves having a width greater than a total of thickness of the locking member and a thickness of said clicker such that a first vibration space is defined between the locking members and said clicker.

3. The ceramic valve apparatus of claim 1, wherein the through hole of said clicker is defined in the driven portion thereof, the engaging portion having at least one stub longitudinally extending from a top of the engaging portion, wherein the at least one stub extends through the through hole of said clicker such that said clicker is simultaneously rotated with said drive seat when the temperature of the outlet water is adjusted.

4. The ceramic valve apparatus of claim 3, wherein the at least one stub having an enlarged position formed at a free end thereof so as to prevent said clicker from detaching from said drive seat, wherein the enlarged portion has a height greater than a height of said clicker relative to the top of the engaging position such that a second vibration space is defined between the enlarged portion and the top of the engaging portion.

5. The ceramic valve apparatus of claim 2, wherein the raised structure extends into the corresponding longitudinal slot at a depth such that a first clearance is defined between a top of the raised structure and a bottom of the corresponding longitudinal slot.

6. The ceramic valve apparatus of claim 3, wherein the raised structure extends into the corresponding longitudinal slot at a depth such that a first clearance is defined between a top of the raised structure and a bottom of the corresponding longitudinal slot.

7. The ceramic valve apparatus of claim 4, wherein the raised structure extends into the corresponding longitudinal slot at a depth such that a first clearance is defined between a top of the raised structure and a bottom of the corresponding longitudinal slot.

8. The ceramic valve apparatus of claim 5, wherein a second clearance is defined between the central protrusion and the multiple tongues, the first clearance and the second clearance defining a clicking space for said clicker.

9. The ceramic valve apparatus of claim 6, wherein a second clearance is defined between the central protrusion and the multiple tongues, the first clearance and the second clearance defining a clicking space for said clicker.

10. The ceramic valve apparatus of claim 7, wherein a second clearance is defined between the central protrusion and the multiple tongues, the first clearance and the second clearance defining a clicking space for said clicker.

\* \* \* \* \*